United States Patent [19]

Waltzer et al.

[11] Patent Number: 4,799,142

[45] Date of Patent: Jan. 17, 1989

[54] IRRIGATION CONTROLLER

[75] Inventors: Bernard Waltzer, Riverside; Jeffery M. Moskin, Los Angeles, both of Calif.

[73] Assignee: The Toro Company, Minneapolis, Minn.

[21] Appl. No.: 117,441

[22] Filed: Oct. 30, 1987

Related U.S. Application Data

[63] Continuation of Ser. No. 883,467, Jul. 11, 1986, abandoned, which is a continuation of Ser. No. 574,397, Jan. 27, 1984, abandoned.

[51] Int. Cl.$^4$ .......................... G05B 11/1; A01G 27/00
[52] U.S. Cl. ..................................... 364/143; 364/146; 364/420; 307/141.4; 340/309.5; 239/69; 239/70; 137/624.15; 137/624.2
[58] Field of Search ............................... 364/143–146, 364/181, 420, 510; 307/41, 141, 141.4; 361/191; 340/309.4, 309.5, 309.15; 239/69, 70; 137/624.11–624.15, 624.18–624.20

[56] References Cited

U.S. PATENT DOCUMENTS

| | | | |
|---|---|---|---|
| 2,409,837 | 4/1944 | Alford . | |
| 2,861,774 | 11/1958 | Buchi . | |
| 2,976,013 | 8/1955 | Hunter . | |
| 3,708,068 | 1/1973 | Tischler | 137/624.2 |
| 3,780,766 | 12/1973 | Link | 137/624.2 |
| 3,799,694 | 3/1974 | Duzan . | |
| 3,991,939 | 11/1976 | Maclay | 239/70 |
| 4,022,541 | 5/1977 | Perrigo et al. . | |
| 4,165,532 | 8/1979 | Kendall | 364/420 |
| 4,176,395 | 11/1979 | Evelyn-Veere et al. | 364/420 |
| 4,189,776 | 2/1979 | Kendall . | |
| 4,232,707 | 11/1980 | Sturman et al. | 307/41 |
| 4,242,040 | 12/1980 | Swearingen . | |
| 4,244,022 | 1/1981 | Kendall | 364/420 |
| 4,307,303 | 12/1981 | Chiu | 307/141 |
| 4,355,953 | 10/1982 | Nelson . | |
| 4,423,484 | 12/1983 | Hamilton | 364/420 |
| 4,506,702 | 3/1985 | Doup | 239/69 |
| 4,526,198 | 7/1985 | Scott | 137/624.2 |
| 4,569,020 | 2/1986 | Snoddy et al. | 364/420 |

FOREIGN PATENT DOCUMENTS 224977 9/1909 Fed. Rep. of Germany .

OTHER PUBLICATIONS

IC Timer Cookbook, 2nd Edition, Walter G. Jung, ©1977 and 1983 by Howard Sams & Co., Inc.

Primary Examiner—John R. Lastova
Attorney, Agent, or Firm—Poms, Smith, Lande & Rose

[57] ABSTRACT

There is shown and described a relatively low cost irrigation controlling apparatus for controlling a plurality of watering or irrigating stations. These stations can be individually set to operate for prescribed time durations. Automatic or manual control is also possible.

2 Claims, 7 Drawing Sheets

IRRIGATION CONTROLLER

This is a continuation of co-pending application Ser. No. 883,467 filed on July 11, 1986, which is a continuation of application Ser. No. 574,397 filed on Jan. 27, 1984, both of which are now abandoned.

BACKGROUND

The present invention relates to controllers for irrigation systems, in general, and, more particularly, to irrigation system controllers employing solid state logic and control circuitry.

There are many types of irrigation controller devices known in the present market. Many of these devices are shown and described in the references noted herewith.

Reference is made to U.S. Pat. No. 4,165,532, entitled "Automatic Irrigation Sprinkler System Controller" by T. L. Kendall, L. G. Downing, and J. A. Ray, and to U.S. Pat. No. 4,189,776, entitled "Simplified Irrigation Controller, by T. L. Kendall. Both of which patents are assigned to the common assignee of this invention.

In each of these patents there is described a solid state controller for the operation of irrigation systems. However, the solid state controller described in U.S. Pat. No. 4,165,532 is particularly adapted for large commercial irrigation systems such as those employed in parks, golf courses, and the like. Accordingly, the input keyboard and the logic sequences incorporated therein are adapted to provide the operator with a wide selection of features. Start times, run times, and the like are directly input as alpha-numeric data through the keyboard which incorporates a plurality of numerically associated keys for the input of such data.

Also, reference is made to the copending application entitled "Improved And Flexible Irrigation Controller" by J. M. Mylne III filed on Feb. 17, 1984, bearing Ser. No. 581,030, now abandoned and assigned to the common assignee. This application describes a sophisticated controller system for irrigation systems.

The advantages attendant to such automated programmable solid state controllers are also of benefit to the homeowner. The time devoted to the diligent watering of lawn and plant areas can be a burden to a homeowner. This is particularly true when the homeowner is to be away from home for extended periods of time wherein arrangements must be made, with attendant cost, for someone to come in to perform the watering chores normally accomplished by the homeowner. While the benefits of an automatic controller for the home irrigation system are, therefore, apparent, they may not be such as to justify the expense of a complicated professional controller as described in the foregoing patents and applications.

U.S. Pat. No. 4,189,776, describes a simplified solid state irrigation controller particularly adapted for low cost availability to the non-professional user. However, the system described in the Patent is somewhat simplified, and therefore, somewhat limited in operation capability compared to the system described in U.S. Pat. No. 4,165,532.

It is clear from a review of the cited prior art, all of which is incorporated herein in its entirety by reference thereto, that many of these systems are quite complex and/or quite sophisticated. Some of these systems are directed to commercial users wherein a great deal of technological sophistication is necessary and/or desirable. While some of the prior art also describes units which are directed primarily to the residential market, many of these devices are relatively expensive and/or cumbersome to program and use. Therefore, it is highly desirable to produce a system of the type shown and described herein.

SUMMARY OF THE INSTANT INVENTION

This invention is directed to a relatively low cost, relatively simple to operate, irrigation controller system. The system uses a relatively simple timing drive mechanism. The electronic circuitry which is controlled by the drive mechanism and used to control the output stages is also quite simple.

A real-time clock permits a timing operation to be established. An electronic microprocessor circuit is used to coordinate the circuit operation. However, through the operation of selecting switches and selectively set rheostats, control over the respective stations can be achieved in the on, off or automatic mode. Moreover, manual overrides can be achieved at any of the stations irrespectively of the remainder of the program operation.

DESCRIPTION OF A PREFERRED EMBODIMENT

Figures 1, 2:
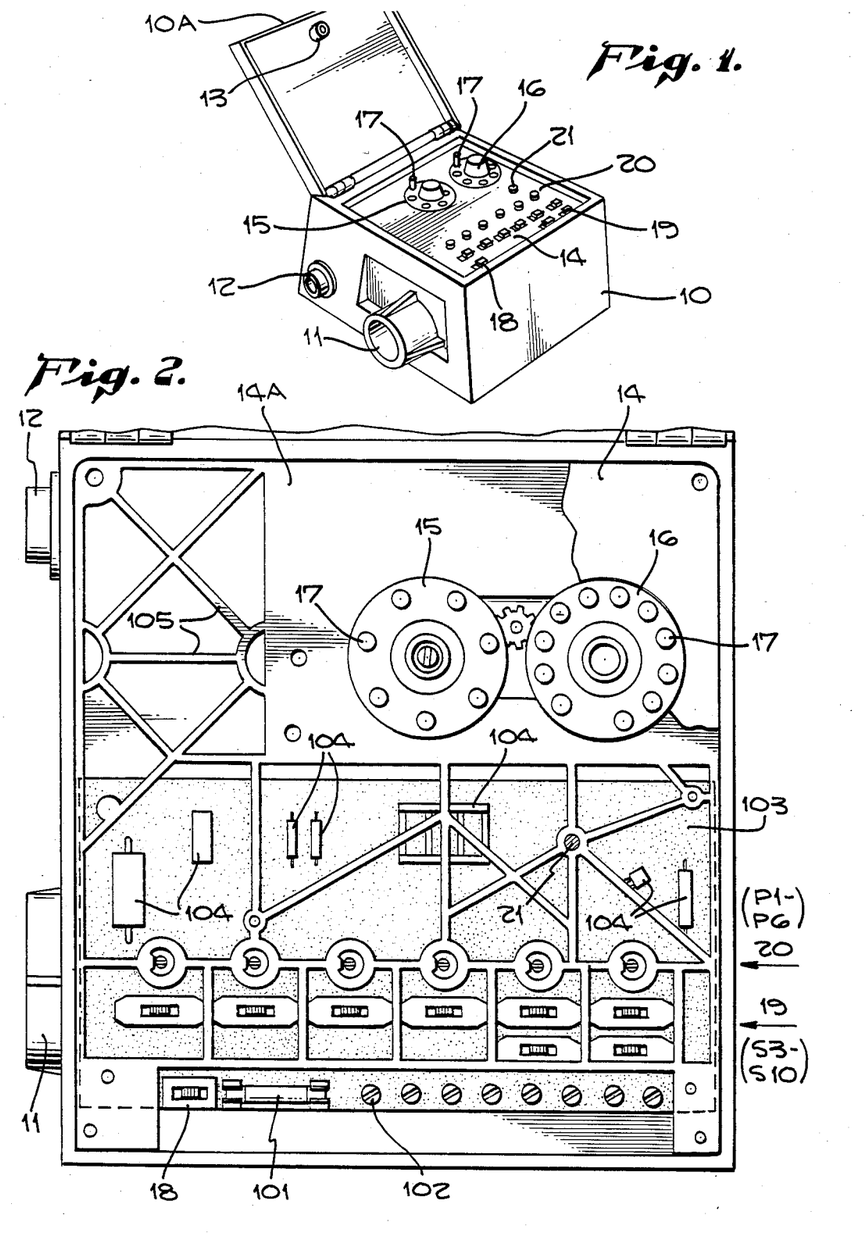
FIG. 1 is a schematic representation of an irrigation controller in accordance with the instant invention.
FIG. 2 is a top view of the internal arrangement of the irrigation controller of the instant invention showing, in schematic version, some of the controls including the switches and rheostats mounted on a printed circuit board.

Referring to FIG. 1, there is shown a schematic representation of a housing wherein the controller of the instant invention is disposed. In particular, the housing 10 can be fabricated in a generally rectilinear configuration. The housing 10 can be fabricated of metal, plastic, or any other suitable material. A fitting 11 is provided wherein access to the interior of housing 10 is provided. Fitting 11 is, typically, an electrical type fitting through which conduit or the like can be extended to permit connections from the unit to the watering stations. Input power is provided through a suitable fitting 12.

In the example shown in FIG. 1, a lid 10A is hingedly mounted to box 10 so that a covering can be provided. In some cases, a lock apparatus 13 is included wherein the cover or lid 10A can be secured to a housing 10 so that a secure system can be provided to avoid tampering by any outside agency.

The mounting board 14 can can be provided in a suitable fashion and can be fabricated of any appropriate material such as plastic or the like. Any suitable labelling and other indicia can be provided on plate 14. In addition, a pair of selection disks 15 and 16 are disposed within plate 14. These selectors are arranged to choose the day or hour during which operation is to occur. The selection mechanism is activated by one of the pins 17 which are disposed in wheels or disks 15 and 16. It is seen that there are 7 of the pins 7 disposed in wheel 15 to select one (or more) days of the week. On the other hand, wheel 16 includes eleven pins which are used to select the hours of the day during which operation is to take place. By the combination of wheels 15 and 16 and the activation of one or more pins 17 in each of the wheels, the day of the week and the hour of the day can be selected during which irrigation operations occur. This operation is chosen by pulling the pins 17 outwardly or by pushing them inwardly in order to selectively engage (or not) the mechanical apparatus (not shown) within the controller of this embodiment.

In one embodiment, an additional operational feature is obtained by pushing the pins inwardly to a second position. That is, the pins interract with levers internal of the unit to control the operation of switches described hereinafter to establish particular watering patterns and/or cycles as a function of the inwardly position of the pins. In the preferred embodiment, the optional arrangement is controlled by the pins on the day wheel 15. In particular, reference is made to the copending application entitled "Electromechanical Irrigation Controller" by Leonard Doup, Ser. No. 543,953, filed on Oct. 23, 1983, now U.S. Pat. No. 4,506,702, and assigned to the common assignee for additional details regarding the construction of the controller device.

Referring to FIG. 2, there is shown some additional detail of the mechanical construction of the housing. The plate 14 is shown to include various structural members 105 which provide strength to the mechanism and also provide various mounting locations for plate 14 and the components mounted thereto.

The wheels or discs 15 and 16 are shown mounted next to eachother with pins 17 disposed therein. The manual start button 21 is shown in FIG. 2 but most of the mechanical interfacing between wheels 15 and 16 is omitted (see the Doup application referenced above).

A printed circuit board 103 is mounted adjacent to the superstructure 14A which supports plate 14. The printed circuit board (PCB) supports a plurality of miscellaneous components which are generally labeled 104. These components are discussed in greater detail infra and include capacitors, resistors, ceramic resonators and other electrical components.

The rheostats 20 are mounted in the structure 14A. The switches 19 are mounted on the PCB 103 and disposed relative to the support members 105 of structure 14A. Also mounted on PCB 103 is the power switch 18 along with the fuse block 101 and the respective terminal elements 102.

As will described hereinafter, each of the switches 19 has three positions, viz. "ON", "OFF," or "AUTOMATIC." By selectively positioning these switches, the operation of a particular output stage or irrigation station is controlled. That is, the station can be turned ON or turned OFF (irrespective of the operation of the remainder of the circuit) or it can be controlled by the circuit wherein "AUTOMATIC" operation occurs. The switches 19 in FIG. 2 are specifically referred to as switches S3-S10 in FIG. 4C.

In addition, a plurality of rheostats 20 (also referred to as rheostats P1-P6) are provided. These rheostats provide adjustment for the time (i.e. number of minutes or hours) which the particular station is operative, and therefore, able to irrigate.

Figure 4A:
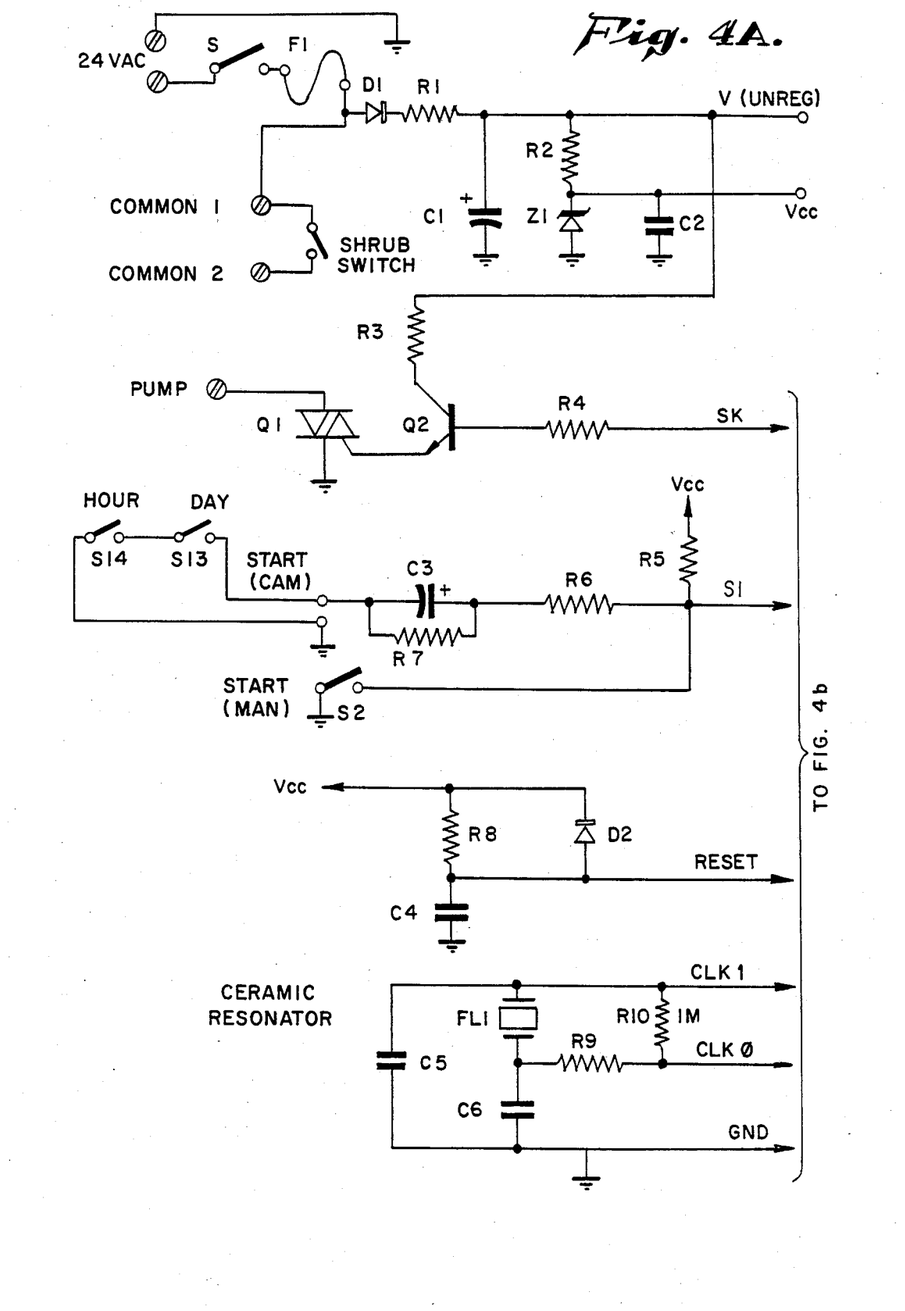
FIGS. 4A, 4B and 4C, show the schematic representation of the electronic circuitry which is used to control the irrigation controller of the instant invention.

Referring now to FIG. 4A, there are shown, schematic representations of portions of the circuitry included in the instant invention.

In particular, the ON/OFF switch S is shown to connect the external power source to the circuit of the instant invention. In the embodiment shown herein, the external power source comprises a suitable source of 24 volts AC which can be provided through a transformer arrangement (not shown). The switch S is connected in series with fuse F1 which, in one embodiment, is on the order of 1.0 amp capacity which permits the circuit to be disconnected from the source in the event of improper operation. The fuse F1 is connected to an input filter circuit comprising diode D1 connected in series with resistor R1 and connected to ground via filter capacitor C1. In addition, resister R2 and Zener diode Z1 are connected in parallel with capacitor C1. Also, a filter capacitor C2 is connected in parallel with Zener diode Z1. The unregulated voltage V is obtained at the junction of resistor R1 and capacitor C1. In like manner, the regulated voltage $V_{cc}$ is obtained across Zener diode Z1 and capacitor C2.

The unregulated voltage V is supplied to the collector electrode to transistor Q2 via resistor R3. The emitter electrode of transistor Q2 is connected to the control electrode of Triac Q1. Triac Q1 is connected between ground and the pump motor start circuit which is represented by the connector PUMP. The base electrode of transistor Q2 is connected via resistor R4 to the terminal SK which is included in the controller element U1. As will appear, when the signal SK is provided at terminal SK as a low level signal, transistor Q2 is turned off and thus Triac Q1 is also turned off. Conversely, when signal SK is a high-level signal, the NPN transistor Q2 is turned on as is Triac Q1.

In the optional embodiment, a shrub switch is connected between the terminals COMMON 1 and COMMON 2 on the PCB. These terminals are connected to a separate shrub watering station. In operation, if a pin on the day wheel 15 is pushed inwardly to the second position, the shrub switch is activated when the day wheel reaches the appropriate position. When the shrub switch is closed, the terminals COMMON 1 and COMMON 2 are connected together to receive the 24 V signal. Through this action, a shrub station can be activated and watering take place. Without closure of the shrub switch, the associated stations remain inactive.

The regulated voltage $V_{CC}$ is supplied via resistor R5 to the Manual or Automatic starting circuits. The Manual start is controlled by switch S2 (equivalent to switch 21 in FIG. 2) which is connected to resistor R5 and to the terminal S1 of control element U1. In a similar fashion, the CAM start switch includes switches 13 and 14 and controls the automatic start and is connected, via the filter network comprising resistor R7 and capacitor C3, in series with resistor R6, to resistor R5. The junction of resistors R5 and R6 is connected to the terminal S1, as is the switch S2.

Thus, when switch S2 is depressed manually, terminal S1 is clamped to ground wherein a low level signal supplied to terminal S1 is element U1 thereby causing a signal to be supplied to the control unit which reacts to the signal and initiates automatic operation of the system.

In similar fashion, the CAM signal generated by the action of switches S13 and S14 on the hour and day wheels causes the terminal S1 to receive a signal of approximately zero volts (i.e. a low level signal to be applied at terminal S1 which causes the circuit to operate in the automatic mode.

Upon power turn-on, U1 (reset) is initially held at the low logic level by the action of C4. As time goes on, capacitor C4 is charged to $V_{cc}$ through resistor R8. When the level at U1 (reset) reaches the high logic level, a reset signal is applied to the control unit and the program is reset to its initial state. From this point on, the system continues to execute instructions in accordance with its normal sequence.

The timing circuit includes a constant frequency ceramic resonator FL1 which is connected in series with capacitor C6 and the combination of which is connected in parallel with capacitor C5. This parallel combination is connected to ground and to the ground (GND) terminal of control unit U1. One terminal of resonator FL1 is connected directly to the clock terminal (CLK) of control unit U1. The resistors R9 and R10 are connected in series across resonator FL1. The common junction of resistors R9 and R10 is connected to the clock terminal CLK 0 of control unit U1.

Figure 4B:
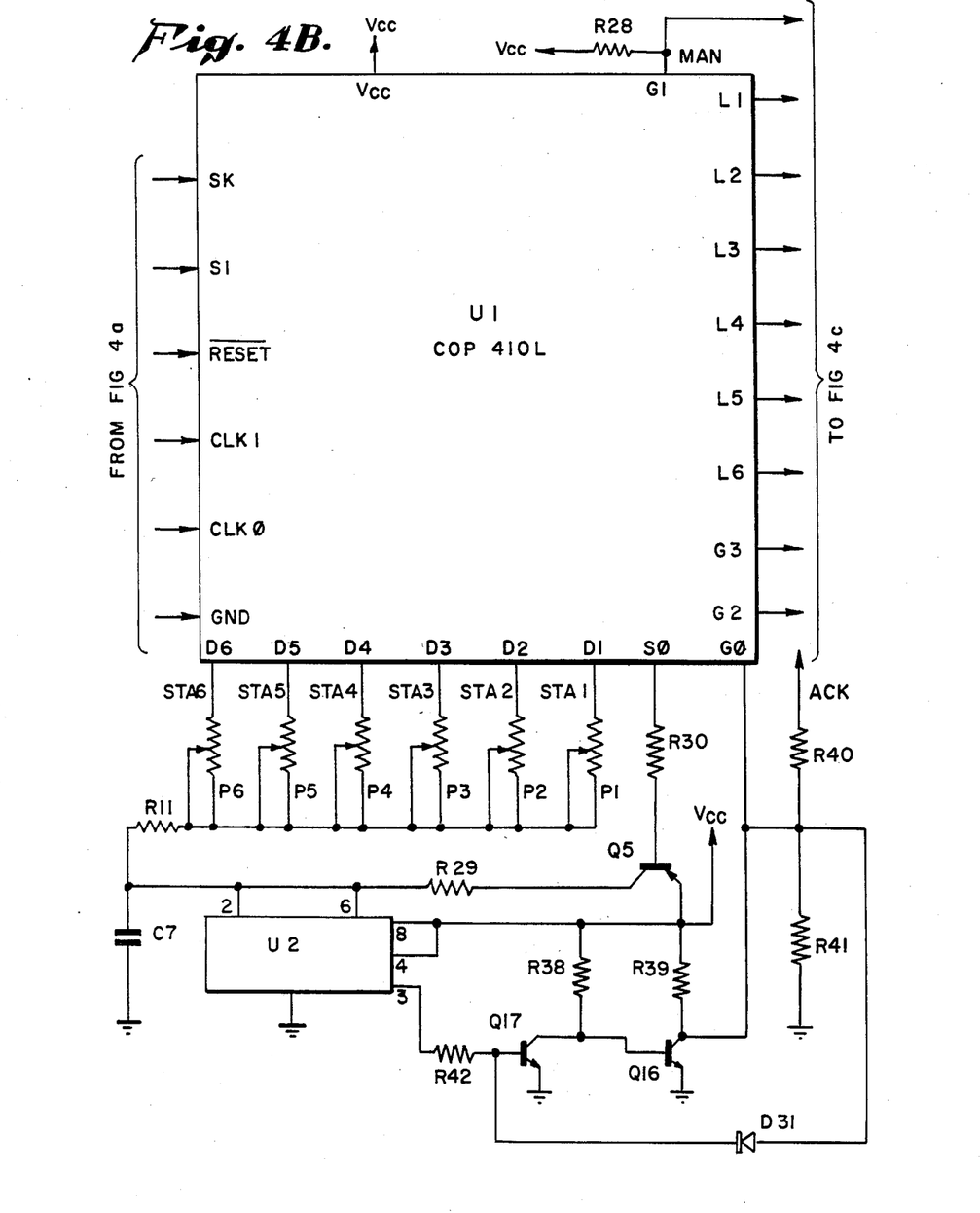

Referring now to FIG. 4B, there is shown the input circuitry which is used to supply specific timing instructions to various stations of the irrigation system. These inputs are supplied by a plurality of rheostats referred to as P1, P2, P3, P4, P5 and P6. The rheostats relate to stages S1 to S6 respectively. In particular, one side of each rheostat P1 through P6 is connected to an input terminal D1 through D6 respectively, of control element U1. In the embodiment shown, rheostat P1 is connected to terminal D1, stage P2 is connected to terminal D2; rheostat P3 is connected to terminal D3; rheostat P4 is connected to terminal D4; rheostat P5 is connected to terminal D5; and rheostat P6 is connected to terminal D6. As will be discussed, by adjustment of the rheostats P1-P6, the time of operation of each station can be selected or controlled between 5 and 60 minutes.

The other sides of all of the rheostats, are connected together and connected to one terminal of resistor R11. The other side of resistor R11 is connected to ground via capacitor C7 and to input terminals of control unit U2 which is a comparator. In addition, the junction of resistor R11 and the capacitor C7 is connected to one terminal of current-limiting resistor R29, which is connected to the collector electrode of PNP transistor Q5. The emitter electrode transistor Q5 and the power terminals of unit U2 are connected to the filtered voltage $V_{CC}$. The base electrode of transistor Q5 is connected to terminal S0 of control unit U1 via resistor R30.

Figure 4C:
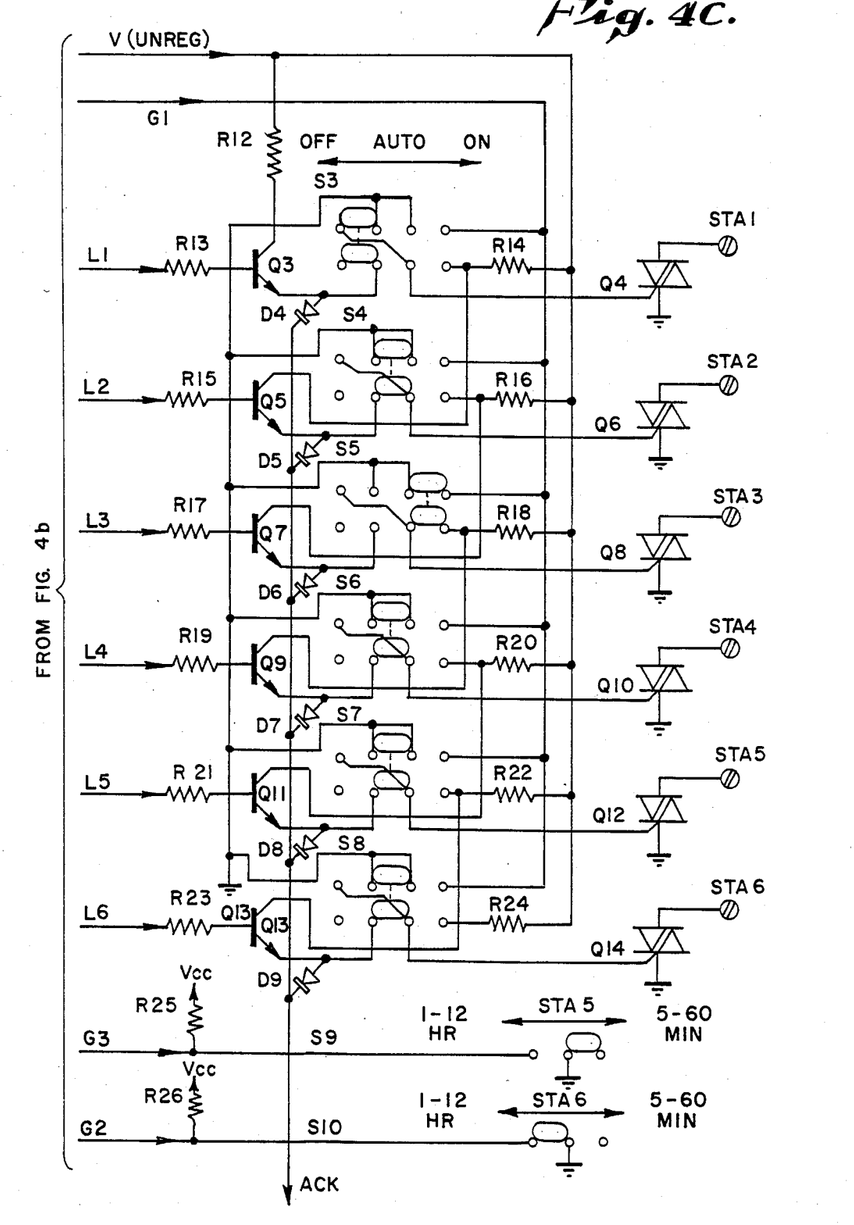

The output terminal of control unit U2 is connected to the cathode of diode D31 which has the anode thereof connected to the ACK terminal of the switching circuitry shown in FIG. 4C. The ACK terminal is also connected to ground via current limiting resistor R41.

Also, the output terminal of control unit U2 (used as a comparator in this application) is also connected to the base electrode of transistor Q17. The collector electrode of transistor Q17 is connected to the base electrode of transistor Q16. The collector electrodes of transistors Q16 and Q17 are connected to $V_{cc}$ via resistors R39 and R38, respectively. The emitter electrodes of transistors Q16 and Q17 are each connected to ground.

Referring now to FIG. 4C, there is shown the switching circuitry arrangement used in the instant invention. In particular, the switches S3 through S10 are depicted. Each of switches S3 through S8 is a dual 3-position switch. Switches S9 and S10 are 2-position switches. The 3-position switches as suggested above, are capable of assuming the OFF, ON and AUTO (automatic) positions. The switches S9 and S10 are able to assume the MIN or HR (i.e., minutes or hours) positions. In particular, in the embodiment shown, when switch S9 or S10 is in the HR position, a one to twelve hour operation is selected. In the MIN position, a 5 to 6 minute operation is selected.

In the case of the switches S9 and S10, one of the pole positions (i.e., the MIN position) is disconnected while the pole is connected to ground. The HR position in each case is connected to a respective terminal of control unit U1. In particular, the terminal G3 is connected to switch 9 while terminal G2 is connected to switch S10. In addition, terminal G3 is connected to voltage $V_{CC}$ via the pullup resistor R25. In similar fashion, terminal G2 is connected to source VCC via pull-up resistor R26.

As noted, each of the switches S3 through S8 each is a dual, 3-position switch. In addition, each of the switches is connected in a substantially similar network or channel. Thus, for purposes of clarity or convenience, only one channel need be described in detail.

In the embodiment shown, the "upper" switch portion includes three positions between four-switch poles. The middle two poles (representative of the AUTO operation) are connected together and to ground. The "ON" (right-most) pole is connected to terminal G1 of the control unit U1. The "OFF" (left-most) pole is cross-connected to one of the middle poles of the "lower" switch portion. This switch pole is also connected to the control element of the Triac Q4. The other of the middle poles is connected to the emitter electrode of NPN transistor Q3 and to the anode of diode D4. The collector electrode of resistor Q3 is connected via resistor R12 to the unregulated voltage source V. The OFF pole is not connected. The ON pole is connected to the unregulated voltage V via current limiting resistor R14, and, as well, to the electrode of the next succeeding transistor in the next succeeding station channel.

Each of the respective channels which is associated with a respective station, (i.e., station 1 through station 6) includes similar components.

In operation, the signal applied to the base of transistor Q3 via resistor R13 from terminal L1 of control unit U1 determines whether transistor Q3 is turned on or not. In a typical operation, the control unit U1 will apply signals to the base of transistors Q3, Q5, Q7, Q9, Q11 and Q13, in sequence, to effectively activate these station control channels. When the respective channels are activated by control unit U1, the position of the respective switch S3 through S8 is interrogated and controlling. For example, as shown in the Station 1 channel, switch S3 is in the OFF position. Consequently, the upper switch portion is arranged to connect a ground signal to the gate electrode of Triac Q4 wherein the Triac remains unactivated and, likewise, the Station 1 utilization device (not shown) remains unactivated.

Likewise, the lower switch portion receives a high level signal through transistor Q3. Thus, the current through transistor Q3 passes through diode D4 to terminal G0 in the control unit U1. The terminal G0 signal is the ACK signal and operates as to indicate to the control unit that the station is in the OFF mode. In turn, the control unit will skip that station when performing an automatic cycle.

In the situation where a switch is in the ON position, as shown in Station 3 channel, the operation is quite different. In this case, the application of a high-level signal from terminal L3 of control unit U1 operates to activate transistor Q7 which receives the unregulated voltage V via resistor R16, and passes through diode D6. However, in this case, the upper portion of the switch S5 connects the terminal G1 to ground, which has the effect of clamping terminal G1 to ground and indicating to the control unit that one of the stations is in the manual mode. The control unit will halt any automatic cycle in process, prevent any additional automatic or manual cycles from being initiated and turn on the pump Triac Q1 via transistor Q2. Operation of switches S3, S4, S5, S6, S7, S8 can simultaneously activate Triacs Q4, Q6, Q8, Q10, Q12 or Q14.

In similar fashion, the lower portion of switch S5 connects the unregulated voltage source V to the control electrode of Triac Q8 via resistor R18. This voltage signal is sufficient to cause Triac Q8 to be activated, whereby the circuitry of Station 3 (not shown) is connected to ground through Triac Q8 and activated. Thus, a watering station (or the like) at station 3 is activated.

In the situation where a switch is in the automatic position as shown in Station 2, the operation is such that when the control unit activates a station, the control unit U1 provides a high logic level signal at L2. This high level signal is transferred to the emitter electrode of transistor Q5 which, in the absence of operation by Triac Q6, is at a high level. However, the clamping voltage of Q6 holds the level to a logic low level. Consequently, the voltage fed back to U1 (G0) is a logic low. The control unit recognizes the logic low as an active station and continues to keep the station in an active condition until the time interval corresponding to the setting of rheostat P2 times out. Following the completion of station 2, the system advances to station 3 and so forth.

Figure 3A:
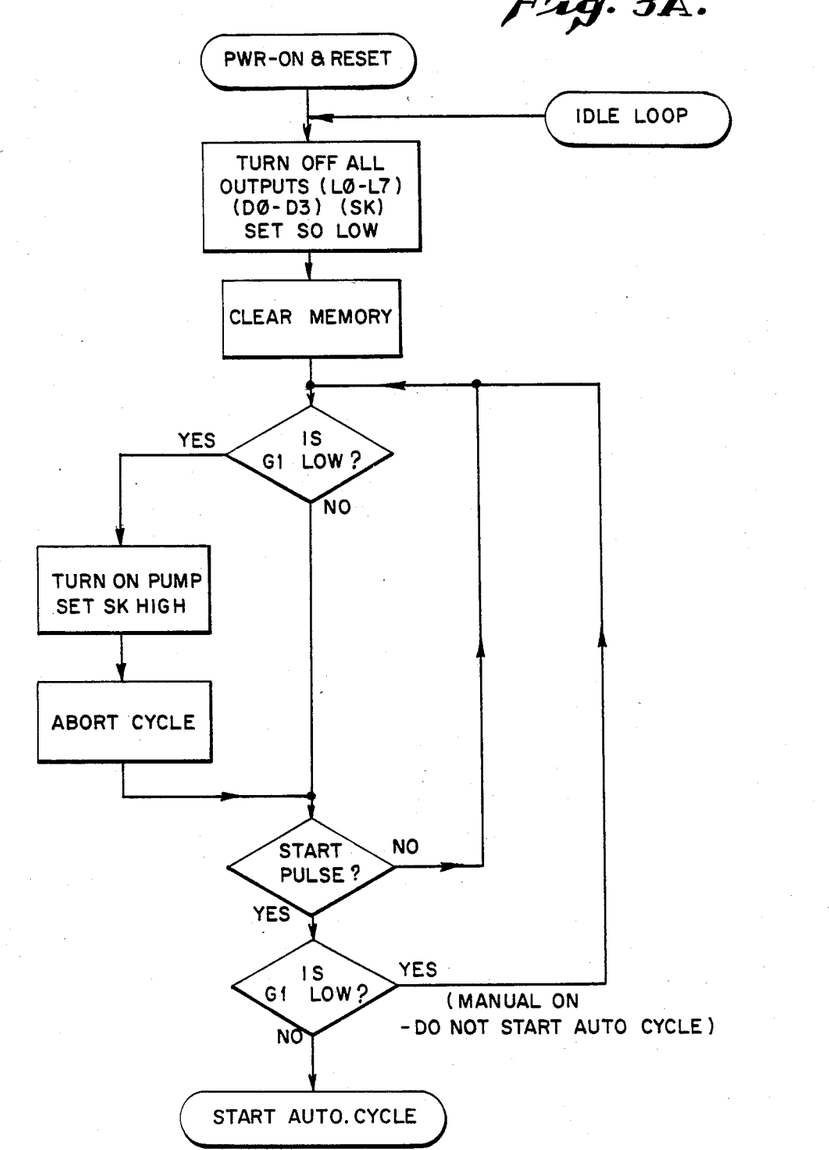
FIGS. 3A, 3B, and 3C show, in flowchart form, the operation of the controller of the instant invention.
Figure 3B:
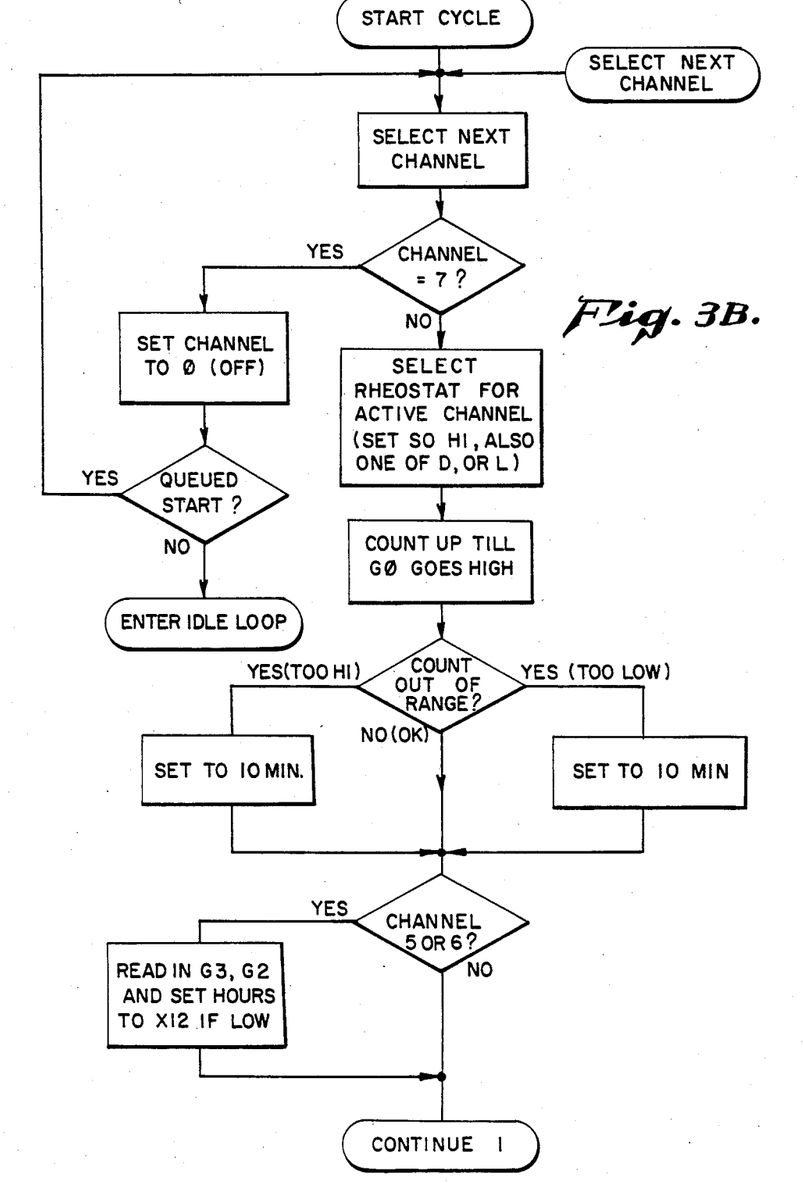
Figure 3C:
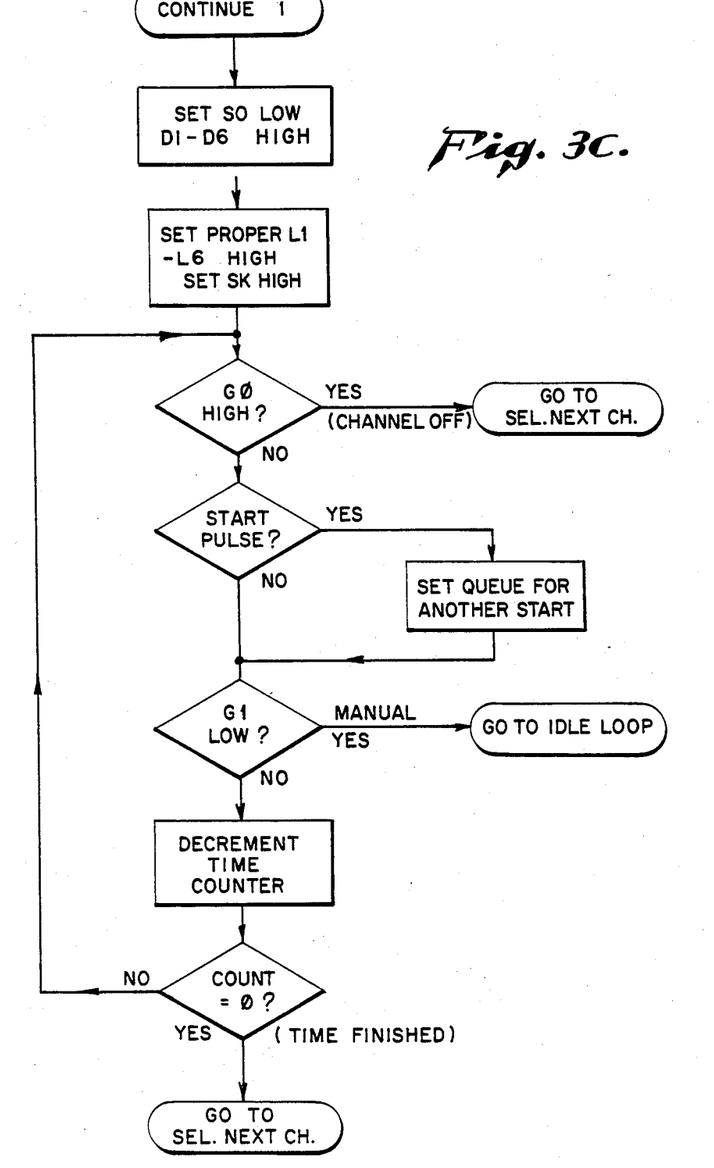

Referring now to FIGS. 3A, 3B and 3C, there is shown, in flowchart form, the operation of the circuit of the instant invention. In particular, in FIG. 3A there is shown the initiating portion of the operation of the system of the instant invention. Thus, the operation begins with the Power On and Reset operation. That is, when the system is initially turned on, it is reset to the initial condition. When this occurs, the system is directed to turn off all of the output Triacs which provide the signals L1 through L6 and SK. Also, the station timing lines D1 through D6 are set to the high impedance state. Thus, all of the signals L1 through L6 and SK are set to the low voltage level wherein all of the respective transistors Q3, Q5, Q7, Q9, Q11 and Q13 connected thereto are turned off and no voltage is present on the control element of the output triacs Q4, Q6, Q8, Q10, Q12 or Q14. The signals at terminals D1 through D6 are set high to prevent a voltage drop from occurring across rheostats P1 through P6 respectively. In like fashion, the signal at terminal S0 is set low thereby allowing timing capacitor C7 to charge up to approximately $V_{cc}$ through transistor Q5 and current limiting resistor R29. As a result of this operation, the memory portion of the control unit U1 is cleared and ready to sequence through its normal system functions.

However, the logic included in Control Unit U1 is now caused to examine the signal at terminal G1 to see if it is a low-level signal. If G1 is low (corresponding to one or more of switches S3 through S8 being in the "manual" position), the signal SK is set high. When the signal SK is set high, transistor Q2 (in FIG. 4A) is rendered conductive and the pump Triac Q1 is turned on. When this occurs, the cyclic part of the operation of the system is aborted and the system remains in the manual mode. This operation causes the system to recirculate and again continuously check to see if G1 is low or not.

On the other hand, if G1 is not low (i.e., G1 is high) the system logic in control unit U1 examines S1 to see if a start pulse has been produced either through the manual or cam switch operation (actuation of both switches S13 and S14 in FIG. 4A). If a start pulse has not been applied, the system recycles back to examine the level of the signal at terminal G1 and continues through this loop.

If, however, a start pulse has been applied, the circuit again detects whether G1 is low or not. If it is, then the system will not enter the automatic cycle inasmuch as the "manual" start has been applied and the system recycles through this loop again. On the other hand, if the system analysis shows that G1 is high and a start pulse has been given and G1 remains high, the system is permitted to start the automatic cycle.

Referring now to FIG. 3B, there is shown the next portion of the operation of the circuit, also in flowchart form. In this case, the cycle has been started in accordance with the operation shown and, described relative to FIG. 3A. Once the cycle has been started, the system automatically selects the next (first) channel. This can be accomplished by a suitable incrementing circuit. When the channel is selected, it is evaluated to determine whether or not the channel number equals seven. This number is meaningful in the embodiment shown because of the six station (or channel) operation. In units having different numbers of channels, the channel comparison feature in this operation is modified accordingly.

If the channel is equal to seven, the system is instructed to set the channel number to zero, turn the system off and examine the start queue location to see if a start signal has been stored in the queue. If there is no start in the queue, the system recycles and is returned to the idle loop (shown and described relative to FIG. 3A.)

If the channel does not equal seven, the rheostat corresponding to the identified channel is connected to a logic low signal level at terminal D1 through D6 by action of control unit U1. This allows capacitor C7 to discharge through the selected rheostat. Output S0 is set to a logic high to prevent the capacitor from being charged by the action of Q5 and R29. This action corresponds to selecting the channel.

The system then goes into a loop and increments a counter circuit for every iteration of the loop. The counter circuit may be resident within the control unit U1. When capacitor C7 has been discharged to a value of approximately $\frac{1}{2} V_{cc}$, as determined by U2 which acts as a comparator in this embodiment, controller U2 produces a logic high level signal on input terminal G0 via transistors Q17 and Q16. The control unit U1 has an internal register which stores a number corresponding to the loop iterations counted by the counter circuit. Sensing the logic high level at G0, the system stops the loop operation and stores the count in an internal register in control unit U1.

The count is then checked and, if too low or too high, a count corresponding to a default watering condition is inserted into the counter. In this embodiment, the default causes the watering time to be set to 10 minutes. If the count is not out of range, or if the default condition is inserted, the channel is again checked. If the selected channel is either 5 or 6, the corresponding hour/minute switch S9 or S10 is examined by testing input terminals G3 or G2. If either switch is in the HR position, the number stored in the counter is multiplied by 12.

Referring now to FIG. 3C, the system operation continues when the system then sets S0 low, allowing the timing capacitor C7 to recharge to its initial value of approximately $V_{cc}$. The system also sets the corresponding outputs L0, L1, L2, L4, L6, L7 and SK to a logic high condition.

Output G0 is tested to see if it is in a logic high condition. If it is, corresponding to a channel in the "Off" position, the system will select the next channel (see FIG. 3B) and repeat the cycle. If G0 is not at a logic high, S1 is tested for a logic high. If a logic high is present at S1 corresponding to a new start pulse, a start signal is stored in the start queue. If a start pulse is not detected (or if the start queue is set), G1 is tested for a logic low. If G1 is a logic low, corresponding to one or more stations being in the manual mode, the system returns to the idle loop (see FIG. 3A).

If G1 is not low, indicating that automatic cycle operations continue, the number stored in the time counter is decremented by one. If this number does not equal zero, that station goes through the loop again until the count is equal to zero. When the count is equal to zero, corresponding to the completion of the watering time, the associated triac is turned off and the next channel is scheduled. The process continues until all channels have been selected and operated.

When all channels have been selected, the system returns to the idle loop in FIG. 3A and system operation begins anew.

Thus, there is shown and described a new and unique water irrigation control system. This system permits improved control over irrigation of multiple watering stations with relatively simple and inexpensive controllers. While modifications to the described system may be conceived by those skilled in the art, any such modifications which fall within the purview of this description are intended to be included therein as well. The description is intended to be illustrative only and not limitative. The scope of the invention is limited only by the claims appended hereto.

We claim:

1. A low cost irrigation control system, comprising:
a plurality of irrigation stations;
electronic controller means having a plurality of input terminals and a plurality of output terminals, said controller means including a counter means and an internal register means;
said electronic controller means providing to each of said stations a remote control dirve signal for selectively activating each of said stations according to a preprogrammed sequence, each station activated for a preprogrammed interval;
clock means connected to said input terminals of said controller means to establish a time standard for use by said internal register means and said counter means;
time selection means connected to said input terminals of said controller means for selecting a period of time during which an irrigation activity may take place, said time selection means including means for providing a start pulse to said controller;
time duration means including a variable resistor-capacitive network connected to said input terminals of said controller means for selecting a duration of time, determined by a time-constant of said resistor-capacitive network, said irrigation activity may occur, said time duration means providing an analog output signal to said controller, by way of a comparator means;
said counter means of said controller, using said time standard established by said clock means, incrementing a digital up-count for the duration of time set by the time duration means until the analog output signal is provided to said controller by said comparator means;
said terminal register means of said controller storing a final up-count that is a function of the time duration established by said time constant of said resistor-capacitive network of said time duration means;
a plurality of multi-position switching means, each having at least on, off, and automatic positions, and each connected between one of said output terminals of said controller means and each of said irrigation stations; when any of said switching means being set to said automatic position, said respective switching means providing a drive signal to said irrigation stations for a time duration that is a function of said final up-count stored in said internal register means and is substantially longer than the time constant of said resistor-capacitive network; and, switching means connected to said input terminals of said controller means to sense a selected position of said multi-position switching means;
whereby said controller means adjusts its control to accommodate selected positions of said switch means and said controller may be informed as to when sequentially activated stations have commenced and ended operation so that an entire automated cycle may be executed.

2. A low cost irrigation control system, comprising:
a plurality of irrigation stations;
electronic controller means having a plurality of input terminals and a plurality of output terminals, said controller means including a counter means and an internal register means;
said electronic controller means providing to each of said stations a remote control drive signal for selectively activating each of said stations according to a preprogrammed sequence, ech station activated for a preprogrammed interval;
clock means connected to said input terminals of said controller means to establish a time standard for use by said internal register means and said counter means;
time selection means connected to said input terminals of said controller means for selecting a period of time during which an irrigation activity may take place, said time selection means including means for providing a start pulse to said controller;
time duration means including a plurality of parallel-wired alternative variable resistor-capacitive networks connected to said input terminals of said controller means for selecting a duration of time, determined by a time-constant of a selected resistor-capacitive network of said plurality of networks, said irrigation activity may occur, said time duration means providing an analog output signal to said controller, by way of a comparator means;
said counter means of said controller, using said time standard established by said clock means, incrementing a digital up-count for the duration of time set by the time duration means until the analog output signal is provided to said controller by said comparator means;

said internal register means of said controller storing a final up-count that is a function of the time duration established by said time constant of said selected resistor-capacitive network of said time duration means;

a plurality of multi-position switching means, each having at least on, off, and automatic positions, and each connected between one of said output terminals of said controller means and each of said irrigation stations; when any of said switching means being set to said automatic position, said respective switching means providing a drive signal to said irrigation stations for a time duration that is a function of said final up-count stored in said internal register means and is substantially longer than the time constant of said selected resistor-capacitive network; and, switching means to said input terminals of said controller means to sense a selected position of said multi-position switching means;

whereby said controller means adjusts its control to accommodate selected positions of said switch means and said controller may be informed as to when sequentially activated stations have commenced and ended operation so that an entire automated cycle may be executed.

* * * * *